Oct. 25, 1932.  E. M. MENNICKE  1,884,070
COFFEE PERCOLATOR
Filed Dec. 9, 1930

INVENTOR.
Emil Max Mennicke
BY Max D. Ordmann
ATTORNEY

Patented Oct. 25, 1932

1,884,070

UNITED STATES PATENT OFFICE

EMIL MAX MENNICKE, OF NEW YORK, N. Y., ASSIGNOR OF ONE-HALF TO HERMAN OSWALD LORENZ, OF NEW YORK, N. Y.

COFFEE PERCOLATOR

Application filed December 9, 1930. Serial No. 500,995.

The present invention relates to coffee percolators or the like and has for its principal object the provision of automatic means for discontinuing the heating of the water when it has reached the boiling point and to then immerse the coffee into the heated water for brewing.

A further object is to provide means controlled by the steam pressure of the boiling water to accomplish the foregoing object.

Still another object is to provide a device which may be simply and cheaply manufactured.

With the above and other objects in view my invention comprises the novel construction, combination and arrangement of elements to be hereinafter more fully described, shown, and defined in the appended claims.

In the accompanying drawing which forms part of this specification and in which similar reference characters denote corresponding parts:—

Figure 1:
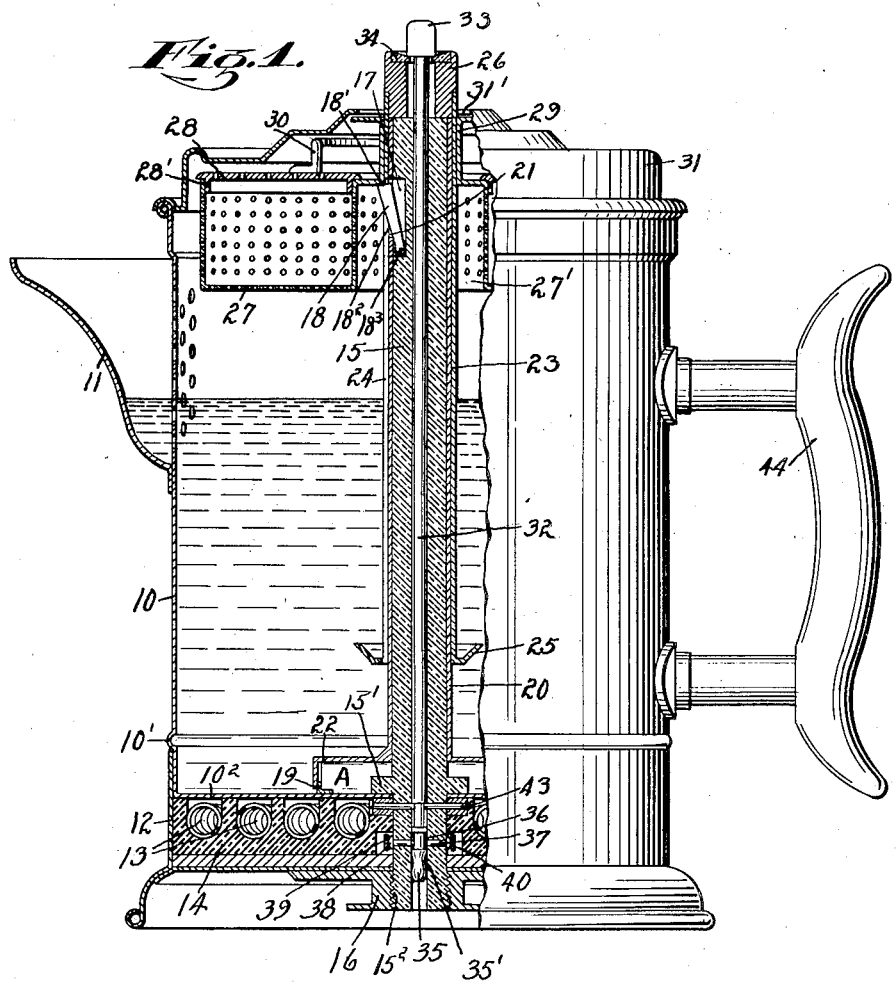
Fig. 1 is a partial sectional elevation of my device.

Referring to the drawing, 10 denotes a cylindrical container for liquid which is provided with a spout 11. Formed along the side wall near the bottom of said container is an annular shoulder 10' and adapted to fit on said container and engage said shoulder is a base 12 spaced from the bottom $10^2$ of said container. Suitably mounted in the space between said base and bottom $10^2$ is an electrical heating unit which may comprise a plurality of resistance coils 13 in electrical series connection and embedded in an insulation plate 14.

A tubular post 15 extends upwardly through the base 12, plate 14, bottom $10^2$ and container 10 and is provided with an annular shoulder 15' that rests on said bottom $10^2$. The lower end of said post 15 which projects below base 12 is threaded as at $15^2$ for engagement with a clamping nut 16 whereby container 10, plate 14 and base 12 are securely fastened together.

Pivotally mounted in a slot 17 near the upper end of post 15 is a swinging catch member 18 having an edge 18' extending laterally from said post and a tapered edge $18^2$. The slot 17 is deep enough so that member 18 may be completely concealed therein. However, the pivot $18^3$ of member 18 is located as to make the latter tend at all times, by its own weight to lie outside said slot.

Concentrically arranged about the post 15 and attached to or integrally formed with the bottom $10^2$ is an annular flange 19 whose diameter is larger than the diameter of collar 15'.

Slidably borne on the post 15 is a tube 20 provided near its upper end with a slot 21 through which member 18 may project. The bottom of said tube is provided with an enlarged cylindrical portion 22 whose diameter is so admeasured that the walls of said portion slidably fit over the walls of flange 19 forming therewith the enclosure A.

Slidably mounted on tube 20 is a tube 23 provided along its wall with a longitudinal slot 24 extending the greater portion of the length of said tube and open at its bottom end so that sliding of said tube will not affect the catch member 18 which projects through the said slot. The lower end of the tube 23 is provided with a flange 25 for a purpose hereinafter to be specified. Attached to the upper end of said tube is a hollow knob 26 of suitable insulation material such as bakelite, wood or the like for manipulation of tube 23.

A sieve-like holder 27 for the coffee grounds is provided. Said container may have a ring-like shape and the walls may be perforated. A perforated cover 28 which has a sleeve-like extention 28' for engaging the walls of said holder is provided and said extension may be frictionally engaged in said container. Other attachment of the cover to said holder may be provided. The holder has a tubular collar 29 mounted about the central hole 27' and the former is either integrally formed with or suitably attached to said holder and it slidably engages the tube 23. Said holder is adapted to be engaged by member 18 and is prevented from sliding down into container 10 unless catch member 18 is released. For manipulation, cover 28 may have a suitable handle 30. A suitable over-all cover 31 adapted to engage the upper edge of container 10 may be provided and said cover has a central opening 31' through which said knob 25 may project.

Figure 2:
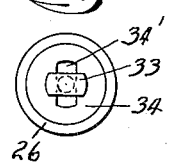
Fig. 2 is a sectional detail.
Figure 3:
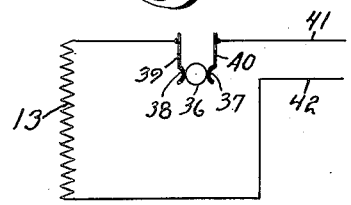
Fig. 3 is a wiring diagram of the electrical connections.

Mounted in the post 15 is a rod 32, the upper end of which is provided with an oblong shaped head 33 which latter is adapted to rest on an insert 34 mounted in a recess on the top of knob 26. Said insert has an opening 34' similar to the section of said head and when the two register said head may pass therethrough. Otherwise, if said head is rotated out of register as shown in Fig. 2, if the knob 26 is raised, said rod 32 is also raised. Said rod 32 may be of insulating material and at its lower end a rounded head 35 is formed. Just above said head is a curved annular recess 35'. Mounted above said recess is a ring 36 of metal. Two electrical brush members 37 and 38 projecting through suitable holes in post 15 are engaged respectively by spring contacts 39 and 40 one of which is connected to one of the free ends of the resistance coils 13 and the other to a terminal prong 41 suitably and insulatively mounted in well known manner (not shown) and projecting to the exterior of said base 12. A second prong 42 also insulatively mounted and projecting from said base is connected electrically to the other free end of the series connected set of heating coils 13. As long as the ring 36 is engaged by the two brushes 37 and 38, the electric circuit through the heating coils 13 is complete when the power source is connected to the terminal prongs 41 and 42. If rod 32 is displaced vertically, by manual or automatic means, the circuit is broken.

The vertical movement of rod 32 is limited by pin stops 43 suitably positioned through post 15.

For convenient handling of the percolator a handle 45 may be provided, which is suitably attached to the container.

The operation is as follows:

The cover 31, holder 27 and tube 23 are removed and tube 20 raised so that tube enclosure A is open. Then water is poured into said container. Then tube 20 is lowered to close enclosure A and tube 23 remounted together with the holder 27 which has been filled with coffee beans or grounds and closed by its perforated cover 28. Since tube 20 is in its lowermost position, catch member 18 projects through the slots in both tubes and retains the holder near the top of the container. The over all cover 31 is then placed over the top end of the container and the rod 32 rotated to the position shown in Fig. 2 and the current connected to prongs 41 and 42. The water is heated until it comes to a boil and then the steam generated in the water contained in enclosure A forces tube 20 upwardly. This causes catch member 18 to be pushed into slot 17 in post 15 and permits the holder 27 to slide down into the boiling water and thereby steep the coffee grounds therein. At the same time the post 32 has been engaged by the knob 26, which has been raised by tube 20, and raised thereby breaking the electric circuit so that no further boiling of the water occurs. The downward movement of the coffee holder is limited by the flange 25 on the end of tube 23.

To raise said holder 27 it is only necessary to rotate posts 32 so that its head registers with opening 34' and then raise knob 26 carrying with it the coffee holder on the flange 25 of the tube 23.

The coffee liquid prepared with my device is very excellent and has a good flavor and aroma because it has not been boiled after the coffee has been steeped in the water.

My employment of steam or vapor pressure to control the electrical circuit and to cause the immersion of the coffee into the boiled water, is not limited to the specific means embodied in the above described modification as various other means may be employed.

I therefore do not wish to be limited to the details shown and described.

What I claim is:—

1. A coffee percolator or the like, comprising a container for liquid having a tubular shaft extending upwardly therein, a holder for coffee slidably mounted on said shaft, a catch member for supporting said holder on said shaft near the top of said container, a slidable tube mounted about said shaft, means at the bottom of said tube adapted to form with cooperating means in said container a separate enclosure for liquid, a slidable rod in said shaft having an electric switch adapted to be opened or closed by longitudinal movement of said rod, said rod being adapted to be moved by movement of said slidable tube and electrical heating means connected to and controlled by said switch whereby when said liquid in said separate enclosure boils said tube will be displaced, releasing said catch member and permitting said holder to be lowered into said liquid and simultaneously opening said electric switch.

2. In a liquid boiler, means in said boiler for holding a substance to be treated therein, means releasably supporting said holder out of the liquid, electric means having circuit make and break elements for heating said boiler, an auxiliary compartment for liquid in said boiler and vapor controlled means in said compartment for operating said releasable means and said electric make and break elements so that when the liquid in said compartment reaches the boiling point said holder will be released permitting it to drop into the liquid and said electric circuit will be broken.

3. A coffee percolator or the like, comprising a container for liquid having a tubular shaft extending upwardly therein, coffee holding means slidably mounted on said shaft, releasable means for supporting said holder near the top of said container, slidable means adapted to form with cooperating means in said container a separate enclosure for liquid, said slidable means engaging said releasable means, and an electrical switch having a movable circuit closing member adapted to be engaged by said slidable means whereby when said liquid in said separate enclosure boils, said slidable means will be displaced releasing said releasable means and permitting said holder to be lowered into said liquid and simultaneously opening said electric switch.

4. A coffee percolator or the like, comprising a container for liquid, a slidable coffee holder in said container, releasable means for supporting said holder near the top of said container, slidable means adapted to form with cooperating means in said container a separate enclosure for liquid, an electrical switch having a movable circuit closing member adapted to be moved by said slidable means and means connecting said slidable means with said releasable means and said member whereby when said liquid in said separate enclosure boils, said slidable means being displaced thereby will cause said engaging means to release said releasable means and permit said holder to be lowered into said liquid and simultaneously cause said engaging means to move said movable member to open said electric switch.

5. A coffee percolator or the like, comprising a container for liquid, a movable coffee holder in said container, releasable means for supporting said holder near the top of said container, an auxiliary liquid compartment in said container having a movable closure member, an electric switch having a circuit closing member for controlling electric heating means for said percolator and means connecting said movable closure member with said releasable means and said circuit closing member whereby when said liquid in said auxiliary liquid compartment boils, said movable closure member will be displaced causing release of said releasable means, permitting said coffee holder to drop into the container liquid, and simultaneous movement of said circuit closing member to open said electric switch.

In testimony whereof I affix my signature.

EMIL MAX MENNICKE.